US007562073B2

(12) United States Patent
Woehler et al.

(10) Patent No.: US 7,562,073 B2
(45) Date of Patent: Jul. 14, 2009

(54) BUSINESS OBJECT SEARCH USING MULTI-JOIN INDEXES AND EXTENDED JOIN INDEXES

(75) Inventors: Johannes Woehler, Salem (DE); Andrew Ross, Altrip (DE)

(73) Assignee: SAP AG, Walldorf (DE)

( * ) Notice: Subject to any disclaimer, the term of this patent is extended or adjusted under 35 U.S.C. 154(b) by 350 days.

(21) Appl. No.: 11/498,633

(22) Filed: Aug. 2, 2006

(65) Prior Publication Data

US 2008/0033907 A1  Feb. 7, 2008

(51) Int. Cl.
G06F 17/30  (2006.01)
(52) U.S. Cl. ...................................... 707/3; 707/103 Y
(58) Field of Classification Search .................. 707/3, 707/103 Y
See application file for complete search history.

(56) References Cited

U.S. PATENT DOCUMENTS

| | | | | |
|---|---|---|---|---|
| 5,594,898 A | * | 1/1997 | Dalal et al. ..................... 707/2 |
| 5,608,904 A | * | 3/1997 | Chaudhuri et al. ............. 707/2 |
| 5,694,591 A | * | 12/1997 | Du et al. ........................ 707/2 |
| 5,701,460 A | * | 12/1997 | Kaplan et al. ................. 707/3 |
| 5,742,809 A | * | 4/1998 | Hayashi et al. ................ 707/2 |
| 5,758,335 A | * | 5/1998 | Gray ............................. 707/2 |
| 5,787,410 A | * | 7/1998 | McMahon ..................... 707/1 |
| 5,787,411 A | * | 7/1998 | Groff et al. .................... 707/2 |
| 5,806,061 A | * | 9/1998 | Chaudhuri et al. ............. 707/3 |
| 5,842,209 A | * | 11/1998 | Mocek et al. .................. 707/4 |
| 5,848,408 A | * | 12/1998 | Jakobsson et al. ............. 707/3 |
| 5,870,747 A | * | 2/1999 | Sundaresan ................ 707/101 |
| 5,960,426 A | * | 9/1999 | Pirahesh et al. ............... 707/3 |
| 5,978,793 A | * | 11/1999 | Kashyap et al. ............... 707/2 |
| 5,991,754 A | * | 11/1999 | Raitto et al. ................... 707/2 |
| 6,014,655 A | * | 1/2000 | Fujiwara et al. .............. 707/1 |
| 6,085,189 A | * | 7/2000 | Pirahesh et al. ............... 707/3 |
| 6,105,020 A | * | 8/2000 | Lindsay et al. ................ 707/2 |
| 6,243,703 B1 | * | 6/2001 | Couch et al. ................. 707/10 |
| 6,424,967 B1 | * | 7/2002 | Johnson et al. ............... 707/3 |
| 6,507,846 B1 | * | 1/2003 | Consens ..................... 707/100 |
| 6,631,381 B1 | * | 10/2003 | Couch et al. ................. 707/102 |
| 6,643,636 B1 | * | 11/2003 | Au et al. ........................ 707/2 |
| 7,146,370 B1 | * | 12/2006 | Klindt et al. ................ 707/100 |
| 7,191,169 B1 | * | 3/2007 | Tao ............................... 707/2 |
| 7,191,174 B2 | * | 3/2007 | Day et al. ...................... 707/5 |
| 7,213,013 B1 | * | 5/2007 | Subramaniam et al. ........ 707/3 |
| 2006/0069982 A1 | * | 3/2006 | Petriuc ....................... 715/500 |

(Continued)

OTHER PUBLICATIONS

Steinbrunn, M. et al., "Bypassing joins in disjunctive queries", Proceedings of the 21st International Conference on Very Large Databases, pp. 228-238 (Sep. 11, 1995).

(Continued)

Primary Examiner—Don Wong
Assistant Examiner—Thanh-Ha Dang
(74) Attorney, Agent, or Firm—Mintz, Levin, Cohn, Ferris, Glosky & Popeo, P.C.

(57) ABSTRACT

A method and search system for implementing fast access to business objects in a Service Oriented Architecture. The method and search system enables near real-time update of the data used for the results. The method is based on multi-join indexes with anchor surrogate identifiers combined with extended join indexes. The method executes much faster than previous approaches and also reduces response times for complex queries.

19 Claims, 8 Drawing Sheets

U.S. PATENT DOCUMENTS

| | | | |
|---|---|---|---|
| 2006/0074871 A1* | 4/2006 | Meyerzon et al. | 707/3 |
| 2006/0282423 A1* | 12/2006 | Al-Omari et al. | 707/4 |
| 2007/0192343 A1* | 8/2007 | Faerber et al. | 707/100 |
| 2008/0215531 A1* | 9/2008 | Markl et al. | 707/2 |
| 2008/0215534 A1* | 9/2008 | Beavin et al. | 707/2 |

OTHER PUBLICATIONS

Mason, T. et al., "AutoJoin: Providing Freedom From Specifying Joins", Proceedings of the 7$^{th}$ International Conference on Enterprise Information Systems [online], Retrieved from the Internet: URL:http://people.ok.ubc.ca/rlawrenc/research/Papers/AutoJoin.pdf, [retrieved on Oct. 9, 2007].

Lawrence, R. et al., "Querying Relational Databases Without Explicit Joins", Conceptual Modeling For New Information Systems Technologies, Lecture Notes in Computer Science, 2465:278-291 (2002).

* cited by examiner

BUSINESS OBJECT SEARCH USING MULTI-JOIN INDEXES AND EXTENDED JOIN INDEXES

BACKGROUND

One example of a service oriented architecture (SOA) is the Enterprise Services Architecture (ESA), which is based on the SAP NetWeaver technology platform and is implemented using SAP business objects. An SAP business object is a logical object that represents business processes in software. Examples of business objects are "Order" and "Business Partner"—business objects that are found in the ESA. A business object model specifies its components and allowed operations. For example, components of the Order business object are the order items and their suppliers. Examples of operations are creation, deletion and search.

SAP NetWeaver uses a search and classification engine called TREX for business object search. TREX stores a business object as tables connected by joins. The TREX search and classification engine performs fast search on the tables that make up a business object. The TREX engine resides in main memory and offers not only standard search functions but also range searches and sorting by one or more attributes. All usual data types are supported, for example STRING, INTEGER and DATE. The TREX search and classification engine also computes the joins between the tables that make up a business object. The joins are specified in advance in a static logical structure called a metamodel. The joins in a metamodel form a join graph. The metamodel represents the tables connected by joins as an object with attributes.

The main components of a metamodel are:
View attributes: These are the object attributes visible for the user. Each view attribute gets its data from a column of a basis table. A query may refer only to the defined view attributes.
Joins: These connect sets of basis tables into an object and are defined in the metamodel. Some search and classification engines such as TREX support inner joins and outer joins.
Anchor table: This is the basis table containing the keys used to identify rows.
The computation of joins is very complex and consumes a great amount of resources, so optimizing joins is critical to achieving good overall performance.

SUMMARY

This document describes a method for enabling a search and classification engine to achieve fast overall response times in part by either optimizing the computation of joins or performing the computations in advance.

In one aspect, a computer-implemented method, executed by a search system on a database of business objects, is disclosed. The method includes an act of generating at least one multijoin index and at least one extended join index based on a metamodel that defines tables connected by joins of a business object. The method further includes an act of searching the business object using the at least one multijoin index and at least one extended join index.

In another aspect, a computer-implemented method includes the acts of receiving in a search system a search query for a search of basis tables of a business object, identifying elementary expressions in the search query, the elementary expressions being linked by AND and/or OR operators, and for each elementary expression identified, determining at least one join path to an anchor table of the basis tables to generate a join graph. In other aspects, the method further includes the acts of segmenting all AND operators into AND groups connected by OR operators, and for each pair of elementary expressions in an AND group, identifying intersections of the join paths in the join graph. In still yet other aspects, the method includes the acts of translating surrogate identifiers of each elementary expression until an intersection is reached to produce surrogate identifiers of each anchor table, and linking the surrogate identifiers of each anchor table according to the OR operators.

In yet another aspect, a computer-implemented method is disclosed having the steps of receiving in a search system a search query for a search of basis tables of a business object, retrieving a business object metamodel associated with the business object, and determining a join graph from the business object metamodel. The method further includes the steps of calculating join paths between tables that make up the business object based on the business object metamodel to produce surrogate identifier pairs related to each join path, and storing the surrogate identifier pairs in an extended join index.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This disclosure describes a method for implementing fast access to business objects in a data processing system, such as one configured to operate within a service oriented architecture. In some embodiments, a search and classification system provides access to business objects via one or more search queries. Such queries specify criteria that business object instances must satisfy in order to be returned in the result set, given certain special characteristics of business objects.

In preferred implementations, a search query can consist of one or more of the following elements:
Elementary boolean expressions: These can be evaluated on a view attribute.
Operators: Elementary boolean expressions are linked by AND and OR operators.
Result restriction: A query may request return of only the top N results.
Sorting: A sort criterion may be given in the query.

The special characteristics of business objects are as follows. A static metamodel specifies the possible joins for use in evaluating a query. An anchor table specifies the business object keys. And, the search result for a query is a list of business object keys from the anchor table.

Constraints on algorithms for business object search processes include the following. Views for business objects are based on joins, which may include inner and outer joins. Duplicates are not considered, since the results are generated from a list of BO keys. Both the data and the modeling of the business objects can be modified. The basis tables can be accessed. Timepoints for executing updates are not specified.

Once a business object is modeled, TREX generates auxiliary data from the basis tables. The data is stored in structures that minimize memory consumption but allow fast access. Any access method should minimize response time, memory consumption, and update time. Elements of some access methods include materialized views and join indexes.

A materialized view is a fully precalculated view that is stored like a basis table in the database. Evaluation of a search query using a materialized view can be performed on the materialized view itself. Updating materialized views by complete recalculation can be expensive, so incremental update is normally preferred.

A join index is the precalculated join of two basis tables. It can be stored like a basis table in the database. Evaluation using join indexes is performed as usual on the basis tables, except that instead of calculating joins, the engine reads the join indexes. Updating a join index is straightforward. If rows are added to a basis table, the corresponding entries are looked up in the other basis table and written in the join index. If rows are deleted, the corresponding entries in the join index are deleted.

Several access methods will now be presented and described to highlight advantages of the methods disclosed herein.

Access Methods

1. Complete Precalculation of Materialized Views

Figure 1:
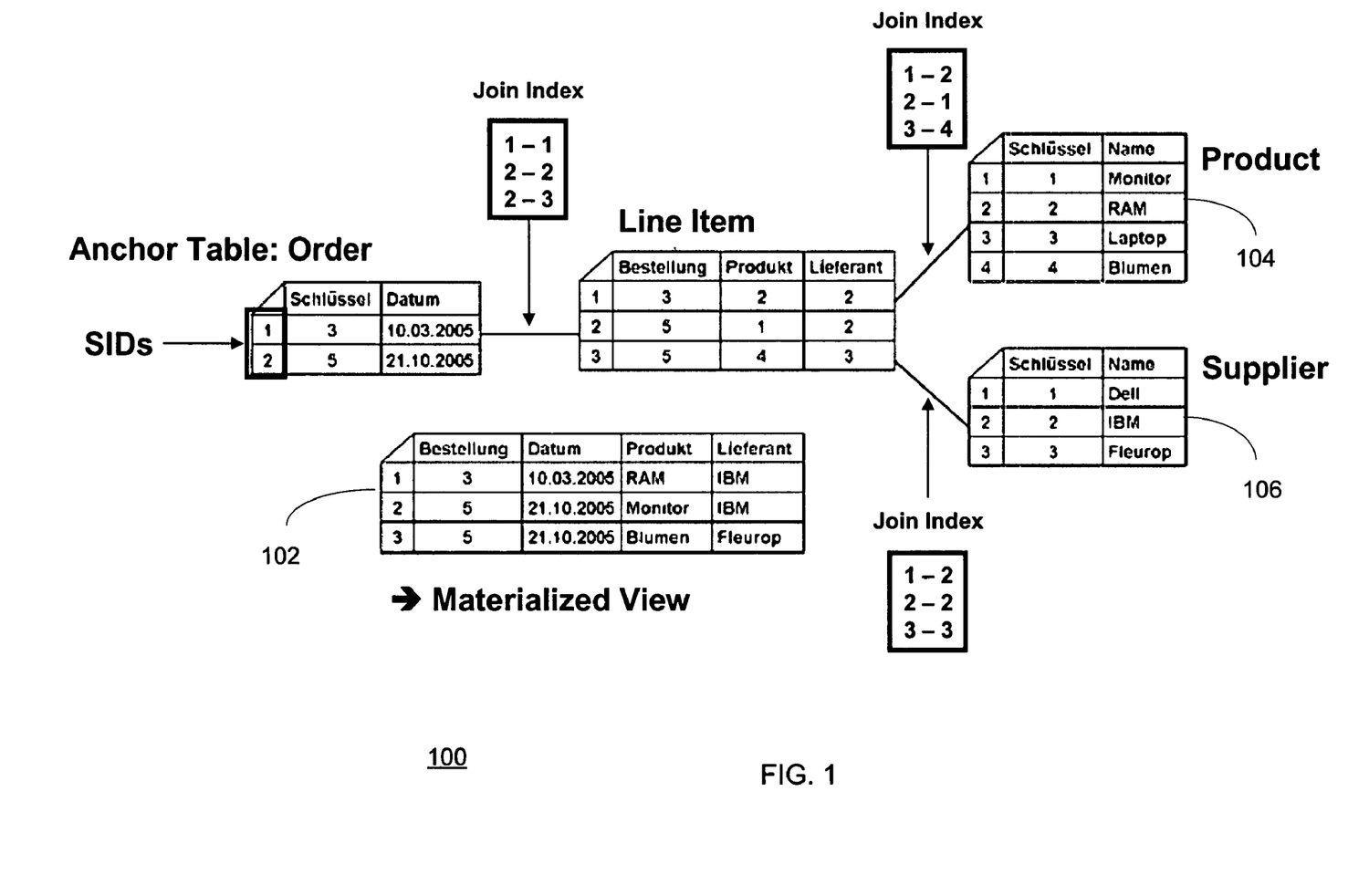
FIG. 1 illustrates a completely materialized view of a search query.

FIG. 1 illustrates an access method 100, in which a materialized view is stored as a basis table 102. In the worst case, a join between two tables 104, 106 corresponds to a cross product that joins each row of one table with every row of the other.

Evaluation of queries using a completely materialized view is the same as on a basis table 102. Each elementary expression of the query is evaluated on the materialized view. For complex queries, several elementary searches are linked by operators. The overhead for the operators is neglected here, since it is the same for all proposed solutions.

Changes to the basis tables require updating the materialized views. In the worst case, a basis table change must be propagated through all joins, which could result in a high computation time.

2. Complete Precalculation of Surrogate Identifier Tables

In this method, only surrogate identifiers (SIDs) for table rows are stored. Complete precalculation of SID tables is a preliminary step for a completely materialized view. The SIDs identify the basis table rows involved in the view rows. The number of basis tables with view attributes determines the number of columns in the materialized view.

A SID table can be stored like a basis table. In the worst case, each basis table has exactly one view attribute, and the number of columns in the materialized view equals the number of view attributes.

Search on precalculated SID tables is more complex than search on a materialized view. The elementary expressions are evaluated on the basis tables, and the results are combined using the materialized SID tables. Changes to the basis tables are propagated with the same algorithms as for a materialized view.

3. Multi-join Indexes with Anchor SIDs

Under this method, for each basis table, a translation table is created that translates the basis table SIDs to the anchor table SIDs. A translation table corresponds to a join index over multiple joins. In general, only a subset of the selected anchor SIDs belong to the exact results.

An anchor SID that may or may not be in the correct result set is said to be uncertain. An anchor SID can be uncertain if the join path from a basis table to the anchor table includes an uncertain table. A table is uncertain if it contains at least one SID that joins to more than one SID in the next outlying table along some join path from the anchor table. Two elementary expressions linked with AND in a query may have different join paths that join an anchor SID via an uncertain table to different SIDs, which may cause the anchor SID to be an invalid result.

The multi-join indexes with anchor SIDs access method does not always give exact results, but only a superset including them. In some embodiments, to assist in obtaining the exact results from the superset, a flag bit is set for rows with uncertain anchor SIDs, as illustrated FIG. 2. These rows can be flagged when the translation table is created. A multi-join index can be stored like a basis table. There is a multi-join index for each basis table with a view attribute.

Figure 2:
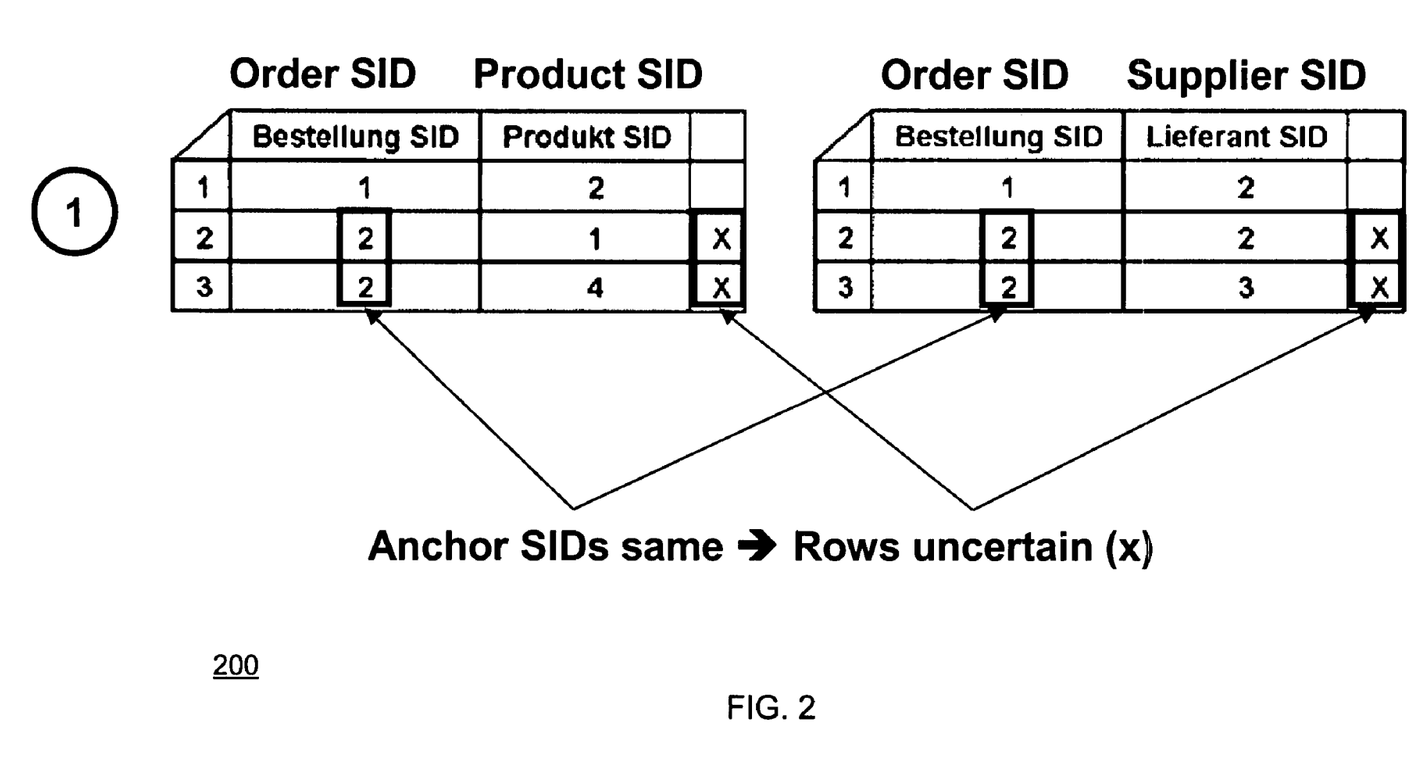
FIG. 2 shows multi-join indexes with uncertain anchor SIDs flagged.

Evaluation of a query with multi-join indexes has two phases. First, the elementary expressions are evaluated on the basis tables. For each basis table, its translation table is used to translate the resulting SIDs into a list of anchor SIDs. These lists are then linked as in the query using the operators AND and OR. Second, to see whether or not the uncertain anchor SIDs belong to the exact result, they are set as restrictions by adding them in AND clauses to the original query and the search performed for the restricted query. The restriction ensures that this search is faster than the original query.

If the basis tables are changed, the multi-join indexes must be updated. If a new row is inserted into a basis table, all multi-join indexes that depend on the basis table are updated. The change is then propagated to all the relevant joins. If a row is deleted, the update complexity depends on the table. If an anchor table row is deleted, all corresponding rows in the multi-join index are deleted. If a row R in any other basis table is deleted, its joins are computed first to determine which rows to delete in the multi-join index. Once these are determined, the row R is deleted and the joins are then recalculated for the other rows. Any entries that cannot be reached by the remaining joins are deleted. If the joins for a row R cannot be computed before the row R is deleted, all the relevant multi-join indexes must be rebuilt. A change in a row is implemented as a delete followed by an insert.

4. Extended Join Indexes

Figure 3:
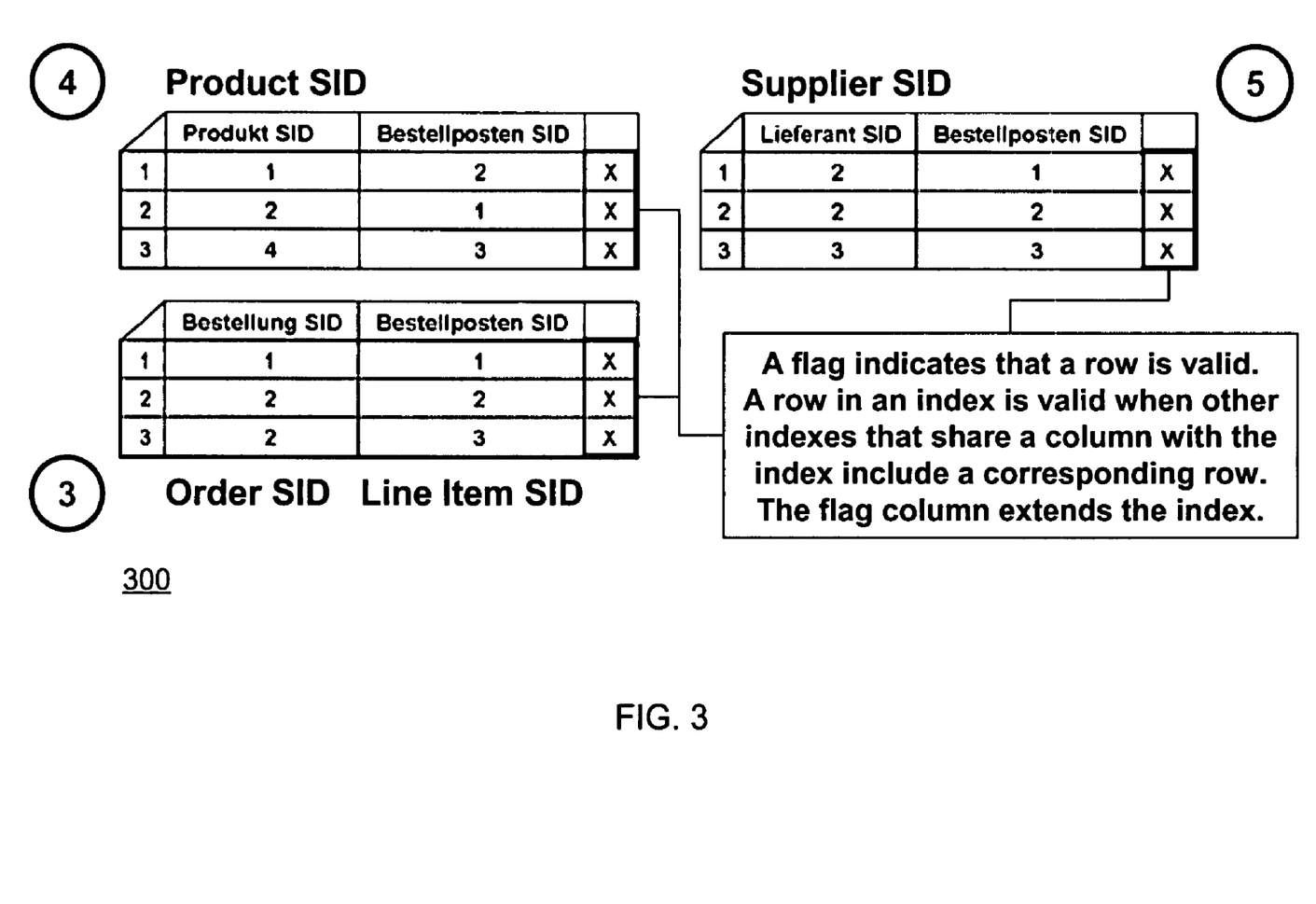
FIG. 3 illustrates extended join indexes for an exemplary business object Order.

For an access method using extended join indexes, a join index is created separately for each join, as shown in FIG. 3. Query evaluation selects basis table SIDs and the join indexes define a join path to anchor SIDs. Other inner joins that are connected to the basis tables on the join path, but are not themselves on that join path, can restrict the result set.

In an aspect of some embodiments, a validity flag (not to be confused with the uncertainty flag introduced above) can be set that marks the validity of a row when other inner joins are taken into account. The flag is maintained when a table is updated. During query evaluation, only rows for which the flag is set are considered.

If the results of several elementary expressions coincide as the SIDs are translated toward the anchor table, then the binary operations between these operations are evaluated directly at that point. This also handles the uncertain anchor SIDs.

An extended join index can be stored like a basis table. Its size is the number of joins in it. This is maximally the cardinality of the cross product of the two joined tables. Elementary search expressions are evaluated directly on the basis tables. The resulting SIDs are translated by the join indexes on the join path to the anchor table. In the worst case, for the translation of the SIDs in anchor SIDs, all join indexes are considered. If a basis table is changed, the join indexes of the adjacent joins are updated. The changes are propagated from these join indexes to other join indexes connected to them by inner joins.

5. Extended Join Indexes with Multi-Join Index Cache

Figure 4:
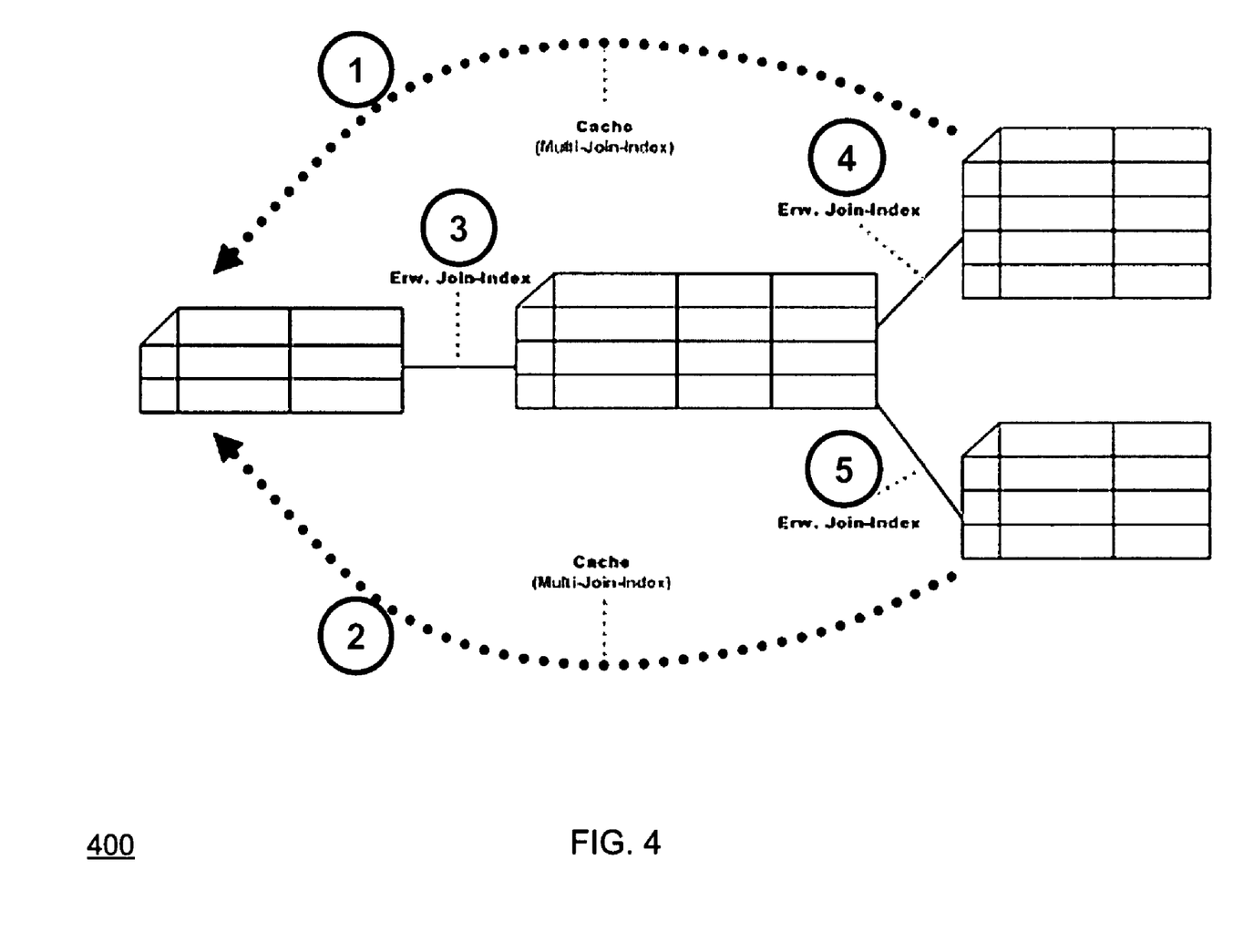
FIG. 4 illustrates an extended join indexes with multi-join index cache.

This method combines multi-join indexes with anchor SIDs and extended join indexes, as shown in FIG. 4. Circled numbers correspond to numbered indexes in FIGS. 2 and 3. This method uses a cache of multi-join indexes. This cache stores translations between basis table SIDs and anchor table SIDs that were executed in previous searches. Later searches can use the translations. Each basis table has its own multi-join index cache. The main data structure used is the join index. It includes columns for uncertainty flags and validity flags, both for the extended join index and for the multi-join index.

Figure 5:
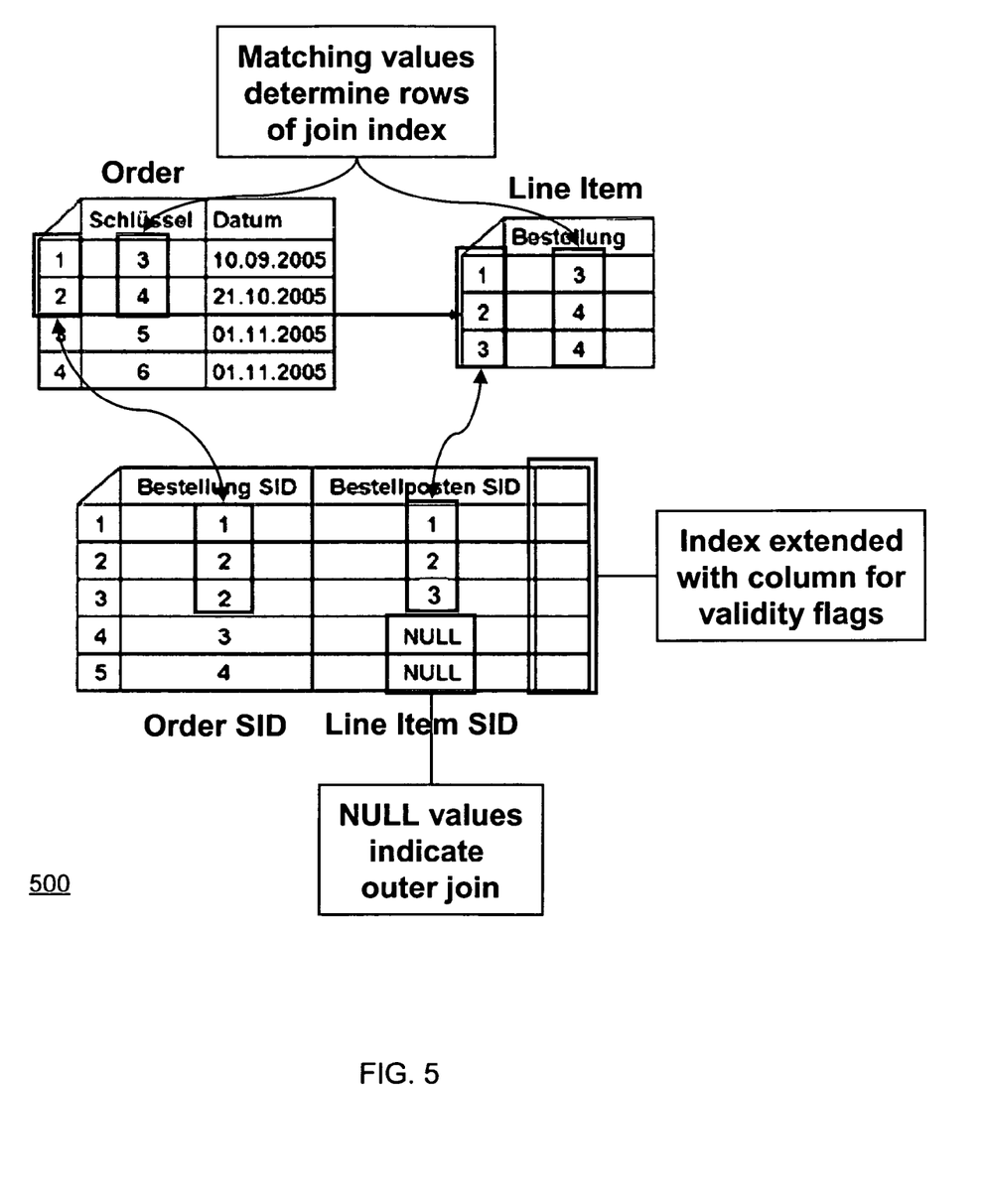
FIG. 5 illustrates an extended join index for an outer join.

Business object models contain not only inner joins but also outer joins. For example, as shown in FIG. 5 if there is no entry in the table "Line Items" corresponding to an entry in the table "Order," then instead of a SID, a NULL value is entered into the join index. This information is needed to support queries containing the elementary expression IS NULL.

Many business object models contain some several of the same joins, so the same table is needed in different places in the model. To prevent interference, different logical tables, called aliases, are used, which refer to the same physical table. Aliases can affect the computation of joins. Extended join indexes can be created only for joins that are really different. However, inner join validity flags must be computed and stored separately for aliases, since the validity of rows depends on the neighboring joins.

Evaluation of Queries

A search query specifies criteria for selecting a list of keys from an anchor table. It can consist of several elementary boolean expressions linked by binary operators such as AND and OR. The expressions are evaluated on the basis tables to which they refer. For each expression, the result is a list of SIDs. The SIDs are checked against the multi-join index cache. If the cache contains the relevant entries, the SIDs are translated to anchor SIDs. Otherwise the extended join indexes are used.

If an extended join index is used to translate the basis table SIDs for an elementary expression to anchor SIDs, the join path is determined to the anchor table. The SIDs of the elementary expression are translated step by step over this path to the anchor SIDs. The anchor SIDs are linked with the operators in the query. Possible operators are AND, OR and NOT. The AND operator corresponds to the intersection of two anchor SID sets. The OR operator corresponds to the union of two anchor SID sets. For the NOT operator, the query is transformed using elementary logic to ensure that all NOT operators operate directly on elementary expressions.

The validity flag bit described above solves the problem that this procedure can ignore inner joins. Tables on the join path to an anchor table can be connected to other tables by inner joins that are not on the join path. These neighboring innerjoins help to determine the validity of any given result. For each row in an extended join index, validity is indicated by the validity flag bit for the row. The translation ignores any row flagged as invalid. The flag is set when the row is generated.

Evaluation Algorithm

An algorithm will now be described that solves the problem that in some cases the result set of computed anchor SIDs is only a superset of the correct anchor SIDs, so that it is not clear which anchor table rows remain in the correct result set.

Figure 6:
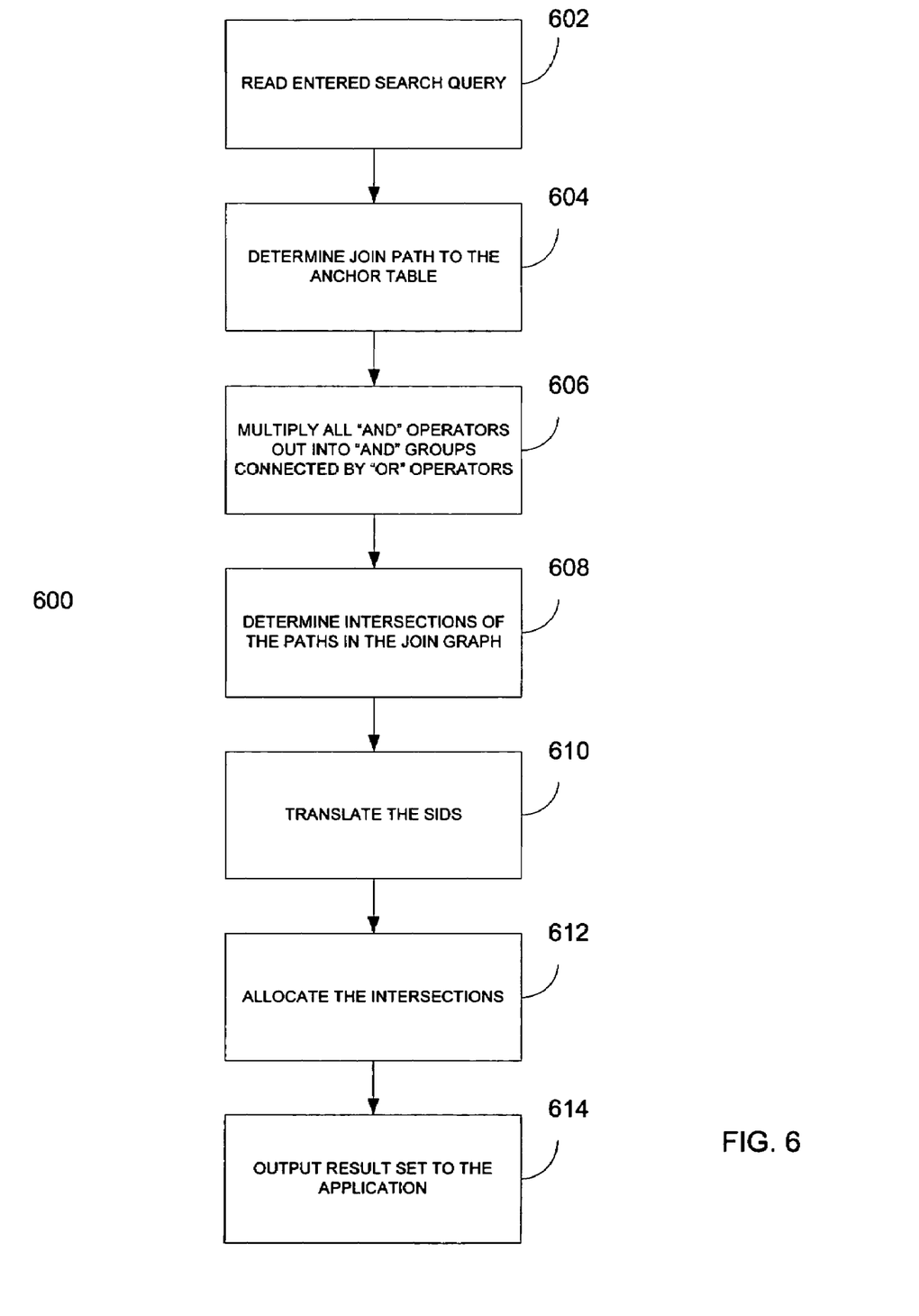
FIG. 6 is a flowchart of a method for calculating anchor SIDs to avoid uncertain SIDs.

FIG. 6 illustrates the algorithm is embodied as a process 600 executed by a computer processor. At 602 the elementary expressions in the input user query are identified. At 604, for each elementary expression, the join path to the anchor table is determined. In the query, at 606, all AND operators are multiplied out into AND groups connected by OR operators.

For all pairs of elementary expressions in an AND group, any intersections of the paths in the join graph are identified at 608. An intersection is a table where the paths meet on the way to the anchor table. For each elementary expression of the original query, the result is a set of intersections with other elementary expressions.

At 610 the SIDs of an elementary expression are translated step by step to anchor SIDs until an intersection is reached. Here the SIDs of the intersecting elementary expressions are linked with AND. The result is translated further toward the anchor table. If an elementary expression appears again in intersections for other AND groups to be calculated later, its SIDs are also translated up to these intersections. At 612 the resulting anchor SID sets are combined in accordance with the OR operators. At 614 the result set is output to the application for the user.

Figure 7:
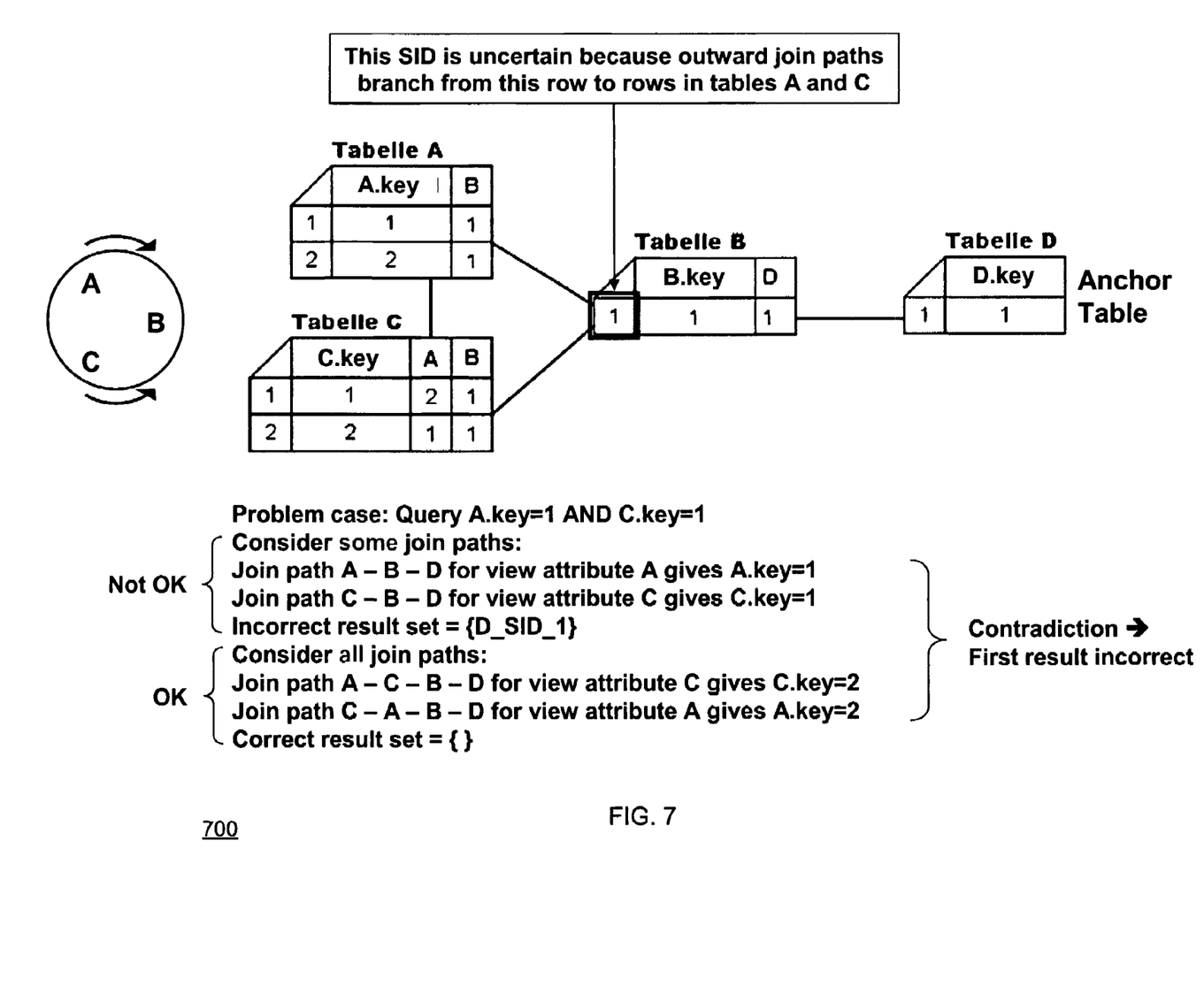
FIG. 7 is a model with a cycle.

The process and algorithm ignore the possibility of cycles as illustrated in FIG. 7. A cycle appears if a join path forms a closed loop. To handle cycles correctly, the algorithm must be generalized. Instead of considering one path for each elementary expression, all possible paths must be generated. The possible paths of an elementary expression are treated as independent paths. Intersections with any other paths are identified and the SIDs are translated along all the intersecting paths. A meeting of two paths is treated as an intersection only if both paths have the same direction.

The generalized algorithm is as follows:

1. The elementary expressions are evaluated on the basis tables. For the resulting SIDs of each expression, it is determined whether they can be translated with a cache.

2. a) If all SIDs of an elementary expression can be translated with a cache directly into anchor SIDs, then this is done. The result is a list of anchor SIDs with any potentially uncertain SID flagged. This flag is set at the multi-join index, and states that this SID can become an uncertain anchor ID. b) If any SIDs of an elementary expression are missing in the cache, then the SIDs are translated with the extended join indexes. This translation is then written to the appropriate cache.

3. The translation results are anchor SID lists for each elementary expression (alone or in AND groups) with flags indicating whether these anchor SIDs are potentially uncertain. The anchor SIDs of all expressions within each of the AND groups are linked. The flags are added to mark the uncertain anchor SIDs. If an anchor SID is generated by two elementary expressions and is uncertain for both, then this anchor SID becomes uncertain in the AND group. The result is a list of anchor SIDs with appropriate flags for each AND group. These AND groups are combined with OR operators to create a result list of flagged anchor SIDs.

4. Flagged anchor SIDs undergo an additional check. For each elementary expression of the query, the list of uncertain anchor SIDs is translated back using the appropriate cache to a list of basis table SIDs. The cache data is available for all elementary expressions, since any translations using extended join indexes updated the cache. Since the cache offers not a unique backward translation but only a superset, the list of SIDs is compared with the original list of SIDs for the elementary expressions. All the resulting SIDs are translated using the extended join indexes in accordance with the query into anchor SIDs. Each resulting anchor SID belongs to the correct result.

In many cases, a restructuring of the query can accelerate its execution. A query can be optimized on the basis of estimated hits for its elementary expressions. The hits are estimated from statistics like the number of rows and the number of different values per column.

Figure 8:
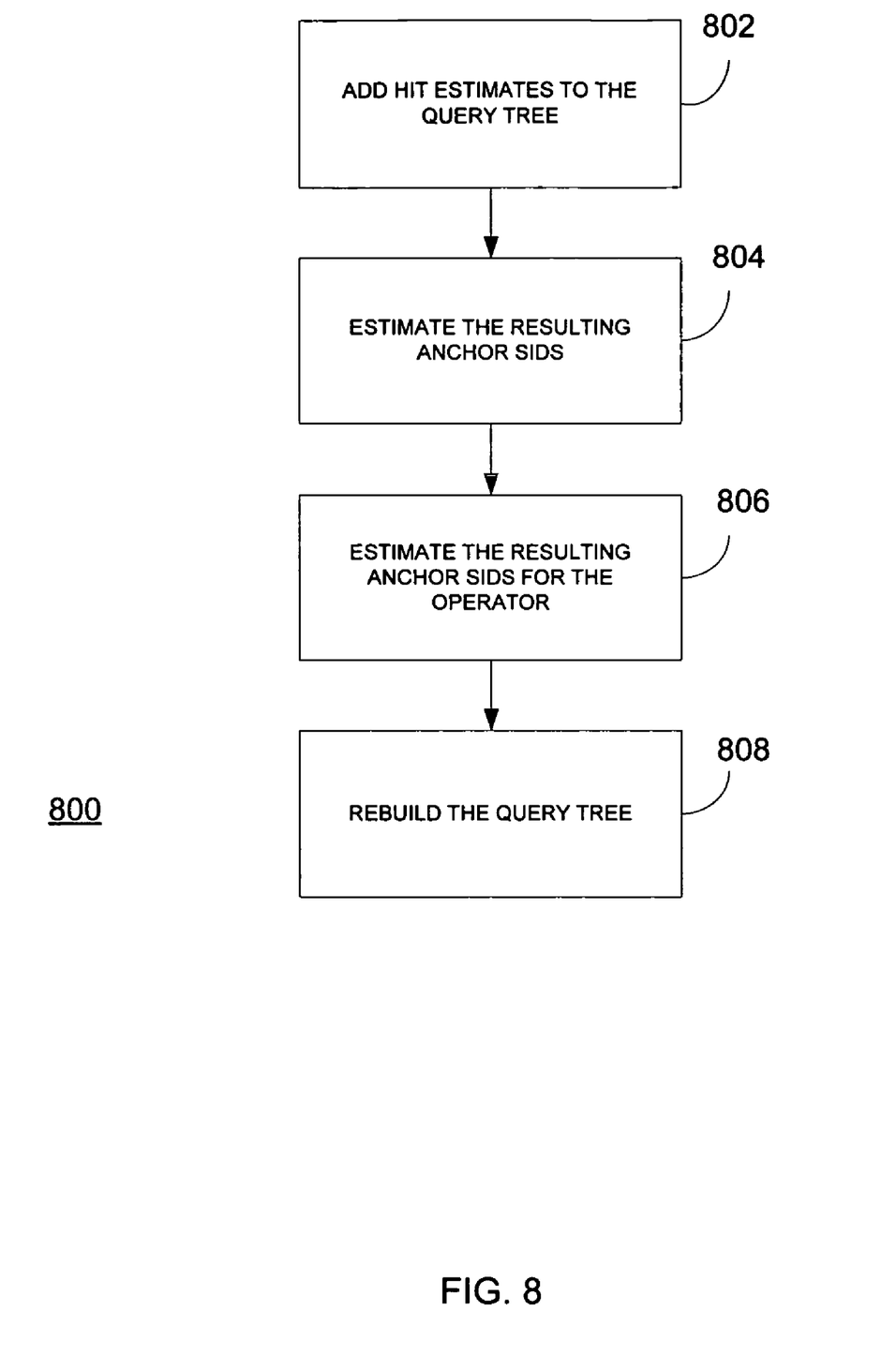
FIG. 8 is a flowchart of a method for optimizing a query tree.

An optimization process 800 executed by an optimizer in a search and classification system can be executed as shown in FIG. 8. At 802 the search and classification system makes initial estimations of the number of hits for each elementary expression in the query. These estimations are not directly usable, since the joins can generate completely different hit sets. To estimate the effect of the joins for each extended join index, a factor called the translation ratio for the join index is calculated. This factor states how many SIDs result on average from the translation of a SID. The product of the initial estimations with this factor measures how much larger or smaller the result sets will become.

At 804, the optimizer works on estimations of the anchor SIDs for each elementary expression. To calculate this estimation for an elementary expression, the estimated hit quantity is multiplied along the path to the anchor table by the factors of all extended join indexes. If there are several paths to the anchor table, estimations for all paths are calculated and the average value is determined. The calculated anchor SIDs are entered in the tree representing the query.

At 806 estimations are computed for the operator nodes. An AND operator node is assigned the product of estimations of the operands. An OR operator node is assigned the sum of the estimations of the operands.

Restructuring the query tree at 808 may be worthwhile for AND operations, where the hit set for one operand (here called the reducer) is used to restrict the hit set for the other one. If the operand with the larger hit set is not an elementary expression but a complex subtree, then the reducer limits the search space for all the elementary expressions in the subtree. The query is restructured if the expected hit set for one operand is several times larger than the expected hit set for the other one.

To support restructuring, an extension of the original search algorithm is necessary. To execute the query with extended join indexes and the multi-join index cache, the query is multiplied out to obtain AND groups connected by OR operators. The restructuring occurs only within an AND group.

An algorithm for the restriction of one subtree by another runs as follows. (Executing this algorithm is worthwhile only when the hit sets for the subtrees differ greatly.)

1. The paths of all elementary expressions of both subtrees have a common intersection in the join graph. The position of this intersection depends on the query and on the translations used. For example, if the cache is used, the intersection is always the anchor table. The reducer is evaluated up to the intersection. If all elementary expressions of the reducer are translatable via the multi-join index cache, then the cache is used. Otherwise the extended join indexes are used. The SIDs at the intersection are linked in accordance with the subtree operators (in this case AND operators).

2. If the intersection is the anchor table, the resulting SIDs are back-translated so far as possible via cache into the SIDs of all required basis tables of the other subtrees. For all untranslatable SIDs and for other intersections, back-translation occurs via the extended join indexes.

3. The translated SIDs are used to reduce the search area during the evaluation of the elementary expressions on the subtree. The resulting SIDs are translated back to the intersection. Since the back-translations normally generate a superset, an AND alignment is made with the SIDs of the reducer.

Evaluation of elementary expressions containing IS NULL form a special case. These result in rows in which for the appropriate column contains a NULL value. Also, all results selected on the basis of a non-hitting outer join are returned, which includes not only the SIDs of rows with NULL column value but also the NULL SIDs. These SIDs can be treated in the further translations like every other SID, since the NULL SIDs are in the join indexes.

Join Indexes

Creation

For the approach described here, the appropriate join indexes must be generated in advance from the basis tables of the business object.

Creation: Extended Join Index

Each join in the business object model is calculated completely. The resulting SID pairs are stored in the extended join index. Also, the flags for the validity of the rows are set relative to neighboring inner joins. The reason for flagging valid entries rather than deleting invalid entries is that when flags are used, basis table changes require recalculation of only the neighboring joins for the changed rows. If rows are deleted in the extended join indexes, the joins for these indexes need to be recalculated.

In a business object model, the join graph usually includes small groups of inner joins connected by outer joins. The reason for the use of outer joins in the modeling is that queries should also return business objects for which some of the data has not been maintained. The validity flag bits are computed only within the inner join groups. The algorithm is as follows:

1. Each table in turn makes mutual adjustments of all join indexes for its adjacent inner joins. If a SID appears in one extended join index but not in another, then it is flagged as invalid. This procedure continues until no more changes are made to extended join index. Only rows flagged as invalid in the previous step are compared.

2. Cycles in inner join groups need an additional processing step. In a cycle, that all SIDs meet is not sufficient. To be valid, a SID must also meet itself via the cycle. The tables in the cycle propagate their SIDs around the cycle with the help of the extended join indexes. Each step in the propagation retains information about which SID was the starting point. If the translation returns to the starting table, any SID that does not reach itself via the cycle is flagged as invalid.

3. Step 1 is repeated for the invalid SIDs.

Creation: Multi-join Index Cache

The multi-join index cache contains a direct translation between the SIDs of a basis table and anchor table SIDs, and is built dynamically from implemented searches. Following a search with extended join indexes, to assign the anchor SIDs to the correct basis table SIDs, the SIDs are carried during the translation process. Also during the translation, the potentially uncertain entries are flagged with an uncertainty bit.

Update

If basis tables are changed, the join indexes are updated. The change operations on basis tables are insertion, deletion and modification of a row. Modification of a row is equivalent to a deletion followed by an insertion.

Update: Extended Join Index

If a basis table is changed, all join indexes that translate SIDs of this basis table are changed. Also, the validity bits of any neighboring inner joins are changed as required.

If a row is inserted, the join is calculated for the inserted row and entered in the extended join index. In a join index for an outer join, the appropriate NULL entries are also deleted. The validity of new entries in the join index is checked with the algorithm described above for data generation. The inserted entries are translated over all the extended join indexes and any inner join flags set, then the algorithm described above is implemented for flagging invalid entries.

If a row is deleted, all join index entries with the SID of the deleted row are deleted too. If a join index row with its validity flag set to invalid was deleted, then there is no propagation of the deletion to neighboring innerjoins. If the flag is set to valid and the translated SID can still be translated further, then all neighboring join indexes are still correct. Otherwise the translated SIDs of the other table are set to invalid and the deletion is propagated.

Update: Multi-join Index Cache

Updating a multi-join index cache proceeds as follows. If rows are inserted in the anchor table, the multi-join index does not need to be changed. If rows are deleted in the anchor table, all multi-join index rows with the same anchor SIDs are deleted. If another table is changed, the cache is deleted, since the effects of the changes are not predictable.

Embodiments of the invention and all of the functional operations described in this specification can be implemented in computer software, or in digital electronic circuitry, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to knowledge base architectures that include a relational database; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method comprising:
   receiving in a search system a search query for a search of basis tables of a business object;
   identifying elementary expressions in the search query, the elementary expressions being linked by AND and/or OR operators;
   for each elementary expression identified, determining at least one join path to an anchor table of the basis tables to generate a join graph;
   segmenting all AND operators into AND groups connected by OR operators;
   for each pair of elementary expressions in an AND group, identifying intersections of the join paths in the join graph;
   translating surrogate identifiers of each elementary expression until at least one of the intersections is reached to produce surrogate identifiers of each anchor table; and
   linking the surrogate identifiers of each anchor table according to the OR operators.

2. The computer-implemented method in accordance with claim 1, further comprising generating a result set from the linked surrogate identifiers.

3. The computer-implemented method in accordance with claim 2, further comprising outputting the result set from the search system.

4. The computer-implemented method in accordance with claim 1, further comprising:
   determining whether any of the join paths of the join graph produces a cycle; and
   if the cycle exists, for each elementary expression identified, determining all possible join paths to the anchor table of the basis tables to generate the join graph.

5. The computer-implemented method in accordance with claim 4, wherein translating surrogate identifiers of each elementary expression until at least one of the intersections is reached to produce surrogate identifiers of each anchor table further comprises:
   determining whether any surrogate identifiers of each anchor table are uncertain; and
   flagging the uncertain surrogate identifiers.

6. The computer-implemented method in accordance with claim 1, further comprising estimating a number of elementary expressions identified in the search query.

7. The computer-implemented method in accordance with claim 6, further comprising calculating a translation ratio for the join graph based on an historical average of a number of surrogate identifiers produced from translating two or more of the number of surrogate identifiers.

8. The computer-implemented method in accordance with claim 7, further comprising producing an estimated result set based on the estimated number of elementary expressions identified and the translation ratio.

9. The computer-implemented method in accordance with claim 6, further comprising estimating a number of anchor surrogate identifiers for each elementary expression identified.

10. The computer-implemented method in accordance with claim 9, further comprising estimating a number of operator nodes for the operators associated with each elementary expression identified.

11. The computer-implemented method in accordance with claim 10, further comprising determining whether a result set will be a predetermined factor times larger than an actual result set.

12. The computer-implemented method in accordance with claim 11, further comprising restructuring a query tree associated with the search query.

13. A computer-implemented method comprising:
   receiving in a search system a search query for a search of basis tables of a business object;
   retrieving a business object metamodel associated with the business object;
   determining a join graph from the business object metamodel;
   calculating join paths between tables that make up the business object based on the business object metamodel to produce surrogate identifier pairs related to each join path; and
   storing the surrogate identifier pairs in an extended join index;
   identifying elementary expressions in the search query, the elementary expressions being linked by AND and/or OR operators;
   for each elementary expression identified, determining at least one join path to an anchor table associated with the tables that make up the business object;
   segmenting all AND operators into AND groups connected by OR operators;
   for each pair of elementary expressions in an AND group, identifying intersections of the join paths in the join graph;
   translating surrogate identifiers of each elementary expression until at least one of the intersections is reached to produce surrogate identifiers of each anchor table; and
   linking the surrogate identifiers of each anchor table according to the OR operators.

14. The computer-implemented method in accordance with claim 13, further comprising:
   determining whether any of the join paths of the join graph produces a cycle; and if the cycle exists, for each elementary expression identified, determining all possible join paths to the anchor table of the basis tables to generate the join graph.

15. The computer-implemented method in accordance with claim 13, wherein translating surrogate identifiers of each elementary expression until at least one of the intersections is reached to produce surrogate identifiers of each anchor table further comprises:

determining whether any surrogate identifiers of each anchor table are valid; and flagging the valid surrogate identifiers.

16. The computer-implemented method in accordance with claim 13, further comprising estimating a number of elementary expressions identified in the search query.

17. The computer-implemented method in accordance with claim 16, further comprising calculating a translation ratio for the join graph based on an historical average of a number of surrogate identifiers produced from translating two or more of the number of surrogate identifiers.

18. The computer-implemented method in accordance with claim 17, further comprising producing an estimated result set based on the estimated number of elementary expressions identified and the translation ratio.

19. A search system comprising:

a database that stores basis tables of a business object;

a computer processor that executes a computer program, the computer program comprising computer program code that instructs the computer processor to:

receive a search query for a search of the basis tables;

identify elementary expressions in the search query, the elementary expressions being linked by AND and/or OR operators;

for each elementary expression identified, determine at least one join path to an anchor table of the basis tables to generate a join graph;

segment all AND operators into AND groups connected by OR operators;

for each pair of elementary expressions in an AND group, identify intersections of the join paths in the join graph;

translate surrogate identifiers of each elementary expression until at least one of the intersections is reached to produce surrogate identifiers of each anchor table; and link the surrogate identifiers of each anchor table according to the OR operators.

* * * * *